(No Model.)

W. W. BEAUMONT.
MECHANICAL MOVEMENT.

No. 526,213. Patented Sept. 18, 1894.

WITNESSES:
Chas. Niell
C. Sedgwick

INVENTOR
W. W. Beaumont
BY Munn & Co
ATTORNEYS.

UNITED STATES PATENT OFFICE.

WILLIAM WORBY BEAUMONT, OF LONDON, ENGLAND.

MECHANICAL MOVEMENT.

SPECIFICATION forming part of Letters Patent No. 526,213, dated September 18, 1894.

Application filed October 20, 1893. Serial No. 488,741. (No model.) Patented in England May 26, 1892, No. 9,953.

*To all whom it may concern:*

Be it known that I, WILLIAM WORBY BEAUMONT, of London, England, have invented a new and Improved Mechanical Movement, (for which I have obtained Letters Patent in Great Britain, No. 9,953, dated May 26, 1892,) of which the following is a full, clear, and exact description.

The object of the invention is to provide a new and improved mechanical movement for imparting a gyratory motion to structures and particularly sieves of various kinds, such as sifters in flour mills, coal screens, machines for sizing and sorting grain, seeds, ores and other articles, and the like.

The new mechanical movement is designed to replace with advantage the crank mechanism which is commonly employed where a gyratory movement is to be produced, and to avoid the excessive wear of the moving parts and their bearings, and the harmful vibrations of the framework which are experienced when using the said crank mechanism.

To this end the invention consists of certain features of construction and combinations of parts that will be hereinafter described and claimed.

Reference is to be had to the accompanying drawings, in which similar letters of reference indicate corresponding parts in all the figures.

Figure 1:
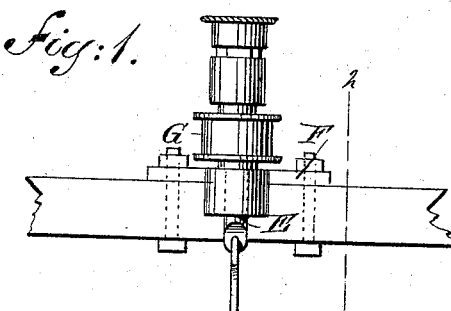
Figure 2:
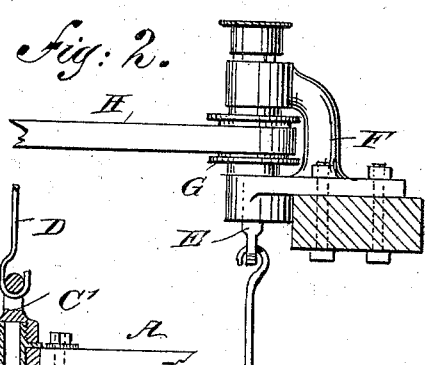
Figure 3:
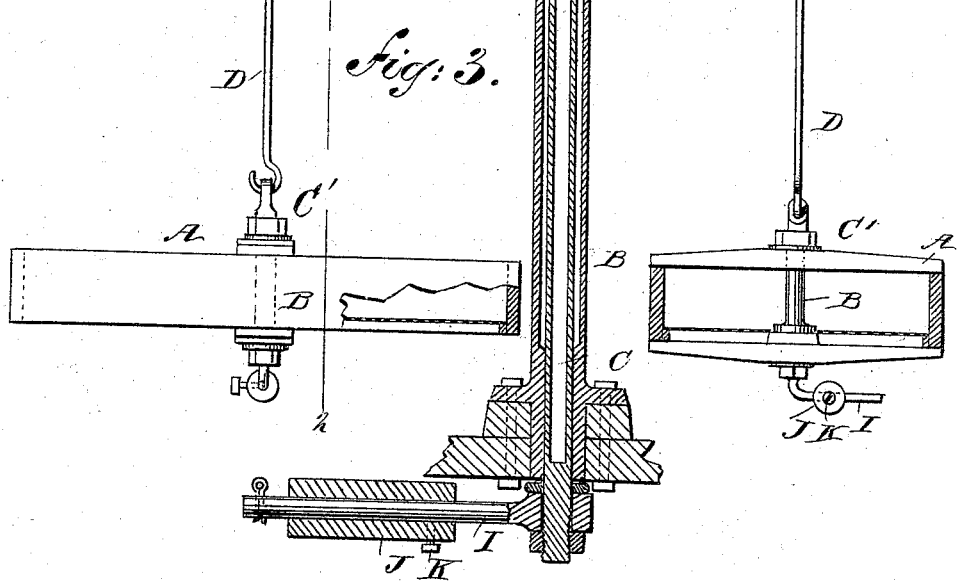

Figure 1 is a side elevation of the improvement as applied to a sieve, parts of which are shown in section. Fig. 2 is a transverse section of the same on the line 2—2 of Fig. 1; and Fig. 3 is an enlarged sectional side elevation of the same.

Like letters refer to like parts in all the views.

The sieve A, which may be of any approved construction, is formed with a bearing B disposed essentially vertically therein. In the said bearing is journaled a spindle C adapted to receive a rotary motion by means of a link or rod D, having an articulated connection with the spindle C, as shown at C', and a similar connection with a shaft E, which is mounted to rotate in a bearing F, attached to a fixed support. The shaft E also carries a pulley G, adapted to receive a belt H.

On the spindle C which is journaled in the sieve, is secured to rotate therewith, an unbalanced weight, that is a weight whose center of gravity does not coincide with the center of motion. The weight may be attached in various manners, for instance, as shown in the drawings, by providing the spindle C with an arm I, and securing the weight J thereon by means of a set screw K or an equivalent device. The weight may also be loose upon the arm I and controlled by a spring upon the said arm.

It will be obvious that when a rotary movement is given to the shaft E, the link D communicating said movement, by torsion, to the spindle C, the unbalanced weight J will be rotated and by thus constantly shifting the center of gravity of the whole suspended device, impart a gyrating motion to the sieve A. The range of this gyratory movement depends upon the radius of the path of the unbalanced rotating weight from the center of rotation, i. e., upon the distance between the axis of spindle C and the center of gravity of the weight, upon the speed of rotation of the unbalanced weight, upon its weight and that of the sieve A, upon the mode of suspension of the sieve, the length of the link D, and upon the position of the plane of the axis of the rotating weight relatively to the plane of the gyratory movement given by it to the sieve or other article to which it is attached.

The rotating weight may be mounted on a fixed spindle attached to the sieve or its equivalent. The bearing B with its spindle C and the unbalanced weight thereon may be attached to any desired part of the device to be actuated, and I desire it to be understood that these changes as well as others that may be found desirable in practice, may be made without departing from the nature of my invention as defined in the appended claims.

By employing the above described means for imparting a gyratory motion to the sieve or other articles, I avoid the transmission of vibrations from the gyrating article to the stationary framework and the building in which it is located, the link D being practically incapable of transmitting such vibrations. All the vibrations set up in the sieve by the rotation of the unbalanced weight, are utilized directly for giving a gyratory motion to the said sieve, instead of being taken up by stationary bearings and subjecting the latter to harmful strains. It will be observed that the suspended article is allowed considerable freedom in its movements, so that comparatively little power will be required to operate it, as the resistances are very slight.

What I claim as my invention, and desire to secure by Letters Patent, is—

1. A mechanical movement, comprising a device to be actuated, a spindle thereon, an unbalanced weight on the spindle, and a rotatable link operatively connected with the said weight to rotate the same, substantially as described.

2. A mechanical movement, comprising a device to be actuated, a spindle thereon, a rotatable link connected with the spindle to rotate the same, and an unbalanced weight on the spindle, substantially as described.

3. A mechanical movement, comprising a suspended device, bearings thereon, a spindle journaled in the said bearings, a rotatable link connected with the spindle for imparting a rotary motion thereto, and an unbalanced weight on the said spindle, substantially as described.

WILLIAM WORBY BEAUMONT.

Witnesses:
WILLIAM GEORGE LINCOLN,
J. A. EDWARDS.